United States Patent [19]
Saarenketo

[11] 3,974,866
[45] Aug. 17, 1976

[54] TREE HARVESTING METHOD AND DEVICE

[76] Inventor: Tapio Heikki Saarenketo, Ilvespolku 20, 96400 Rovaniemi 40, Finland

[22] Filed: Dec. 27, 1973

[21] Appl. No.: 428,712

[30] Foreign Application Priority Data
Dec. 30, 1972 Finland .............................. 3723/72

[52] U.S. Cl. .............................. 144/3 D; 144/2 Z; 144/34 R; 144/309 AC
[51] Int. Cl.² ........................................ A01G 23/08
[58] Field of Search ............. 144/2 R, 2 Z, 3 R, 3 Z, 144/34 R, 34 E, 309 AC

[56] References Cited
UNITED STATES PATENTS

| | | | |
|---|---|---|---|
| 3,371,692 | 3/1908 | Larson et al. | 144/3 D |
| 3,461,928 | 8/1969 | Siiro | 144/3 D |
| 3,612,117 | 10/1971 | Kjell | 144/3 D |
| 3,720,246 | 3/1973 | David | 144/2 Z |
| 3,797,539 | 3/1974 | Moser et al. | 144/3 D |
| 3,797,540 | 3/1974 | Propst | 144/2 Z |

*Primary Examiner*—Othell M. Simpson
*Assistant Examiner*—W. D. Bray
*Attorney, Agent, or Firm*—Steinberg and Blake

[57] ABSTRACT

In a tree harvesting method particularly suitable for selective logging, the upper part of a tree will be limbed and bucked into logs by means of a harvesting device before the tree is severed at the butt. During the limbing and bucking procedure, the harvesting device will be secured tightly to the lower part of the tree so that the pressure against the device is transferred to this lower part and thus no massive support carrier is needed for the harvesting device. The upper part of the tree can be bucked, after it has been severed from the lower part, by lowering it in upright position the length of a log at a time to the side of the lower part and by severing each log thereof at the height of the upper end of the lower part. The convenient height of the lower part of the tree corresponds approximately to the length of a log.

10 Claims, 2 Drawing Figures

Fig. 2

TREE HARVESTING METHOD AND DEVICE

BACKGROUND OF THE INVENTION

1. Field of the Invention

The present invention relates to a method for limbing and bucking selected standing trees in a forest by means of a harvesting device moved by a skidder or a corresponding carrier. The invention also relates to the harvesting device designed to carry out the method.

2. Description of the Prior Art

There are several machines available for harvesting trees, but at the present time there is no suitable machine which can efficiently be used in selective logging.

In selective logging, we are forced to fell certain trees amidst others and to pass them through narrow spaces to the driveway. Little room is left for moving and working; therefore the dimensions of the machine constructions should be small. In addition, good movability and speed of operation presuppose light constructions which also must be aimed at in order to prevent root damages. The third important condition in striving for efficiency is the extension length; however by adapting conventional solutions, the realization of this requires a massive support carrier an thus seems to conflict with the other characteristics set forth to a harvester for selective logging.

Because the mechanization of selective logging will become ever more timely due to the increasing labour costs and decreasing supply of labour power, many attempts have been made to solve the problems mentioned above. In this connection reference can be made, for example, to U.S. Pat. No. 3,536,113. However, the developed solutions suffer from the disadvantages of high cost, complexity, and limitations in maneuverability and reliability.

SUMMARY OF THE INVENTION

It is a general object of the present invention to provide a tree harvesting method which circumvents and minimizes the problems typical of selective logging.

A further object of the present invention is to provide a tree harvesting device for carrying out the invention.

The harvesting method, in accordance with the invention, is characterized in that before the tree is severed at the butt its upper part will be limbed and bucked by means of the harvesting device, conveniently at the height that corresponds approximately to the length of a log, and that the harvesting device will be secured tightly to the lower part of the tree during the said procedure so that at least a part of the pressure against or caused by the harvesting device is transferred to the lower part of the tree.

In other words, the invention takes advantage of the fact that a tree owing to its roots normally stands quite firmly on the ground. By virtue of this characteristic, its lower part forms a solid support for the harvesting device, unless the trunk is first severed at the butt. The harvesting device can often be fixed so tightly to the tree that almost no pressure will be transferred to the carrier during the limbing and bucking phase. The harvesting device can thus be installed on the end of a relatively long arm without making the carrier massive in any way.

In accordance with the convenient embodiment of the invention, the upper part of the tree will be manipulated in standing position throughout the limbing and bucking phase. As it is lowered towards the ground, logs will be severed from its lower end. Thus the space needed for limbing and bucking is not much bigger than the space the tree has used for growing. This is of considerable importance when operating in thick stands. If, in addition, the logs which have been severed are not allowed to fall, they can easily be gathered in one bundle which can be transported to a desired place after the lower part of the tree has been severed.

BRIEF DESCRIPTION OF THE DRAWINGS

The principle of the invention appears most clearly in the accompanying drawings which represent the harvesting device designed to carry out the method in accordance with the invention and in which.

DESCRIPTION OF THE PREFERRED EMBODIMENT

Figure 1:
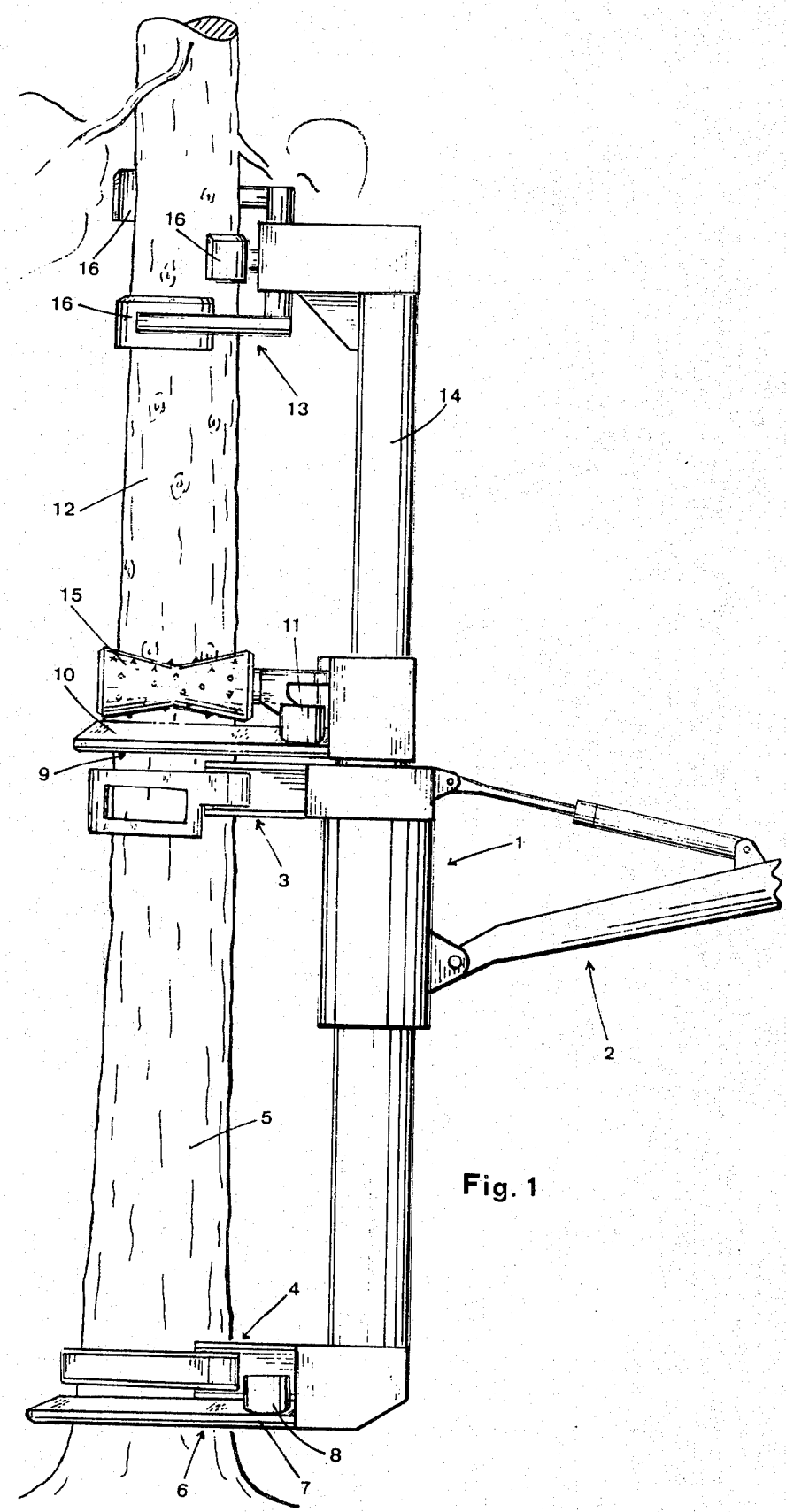
FIG. 1 is a side elevational view of the device at the beginning of the tree harvesting operation.

Referring in detail to the drawings, there is shown a tree harvesting device whose main part is the body 1 which can be connected, for example, to the end of an articulated or telescopic arm 2 installed on a skidder (not shown). Two tong-like support and clamp means 3 and 4 diverge from the body 1 whereby the harvesting device is tightly supported to the lower part of the tree 5. Connected to the lower of these means 4 is a severing device 6 which cuts the lower part of the tree 5 at the butt in the last stage of harvesting. The severing device 6 comprises a chain saw (not shown) within the guard 7 and a motor 8 to actuate the saw.

Another severing device 9 whereby the tree is bucked is mounted on the upper end of the body 1. This severing device 9 is similar to the device 6 and comprises a chain saw (not shown), a guard 10, and a motor 11. During the bucking, the upper part of the tree 12 is supported by a clamp means 13 located on an arm 14 which moves upwards and downwards in relation to the body 1. The upper part of the tree 12 is fed downwards through two guiding rolls 15 either by making them rotate or by moving the clamp means 13 downwards. When the upper part 12 has been fed to the desired length of the log, the log is separated by the severing device 9. This severing device, as well as the clamp means 13 and guiding rolls 15, rotate, preferably with the arm 14, about the vertical axis of the body 1. The upper part of the tree 12 can thus, when necessary, be removed from above the lower part 5 or the severed logs. For the limbing of the upper part 12, limbing blades 16 are connected to the clamp means 13. These blades will hit and sever the branches when the upper part of the tree 12 moves in relation to the clamp means 13.

Figure 2:
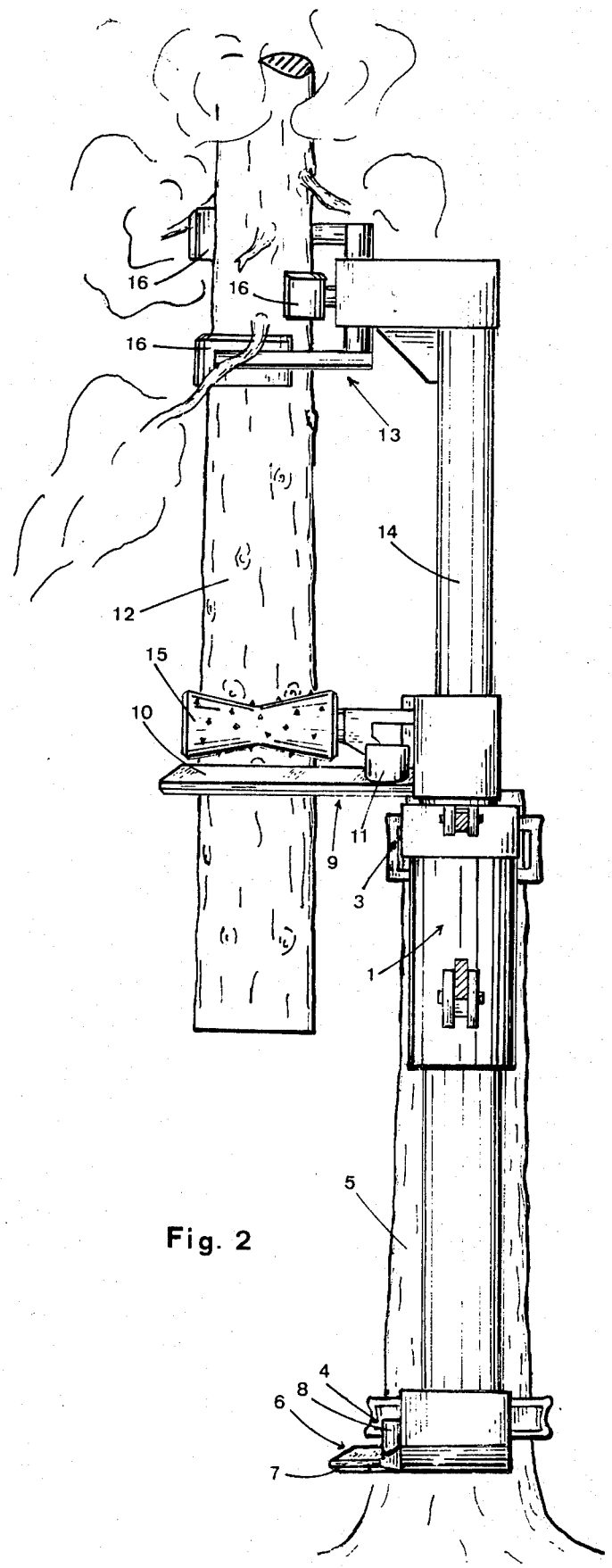
FIG. 2 is a front elevational view of the device after the upper part of the tree has been separated from the lower.

In the beginning of the tree harvesting operation, the harvesting device is positioned about the tree as shown in FIG. 1. The tong-like support and clamp means 3 and 4 are actuated to grip the tree and to secure the harvesting device tightly thereto. The clamp means 13 is actuated to grip and support the upper part of the tree which is severed by the severing device 9 at the height that corresponds approximately to the desired length of a log. As shown in FIG. 2, the severed upper part of the tree is removed from above the lower part by rotating the arm 14 and it is now bucked by feeding it downwards through the guiding rolls 15 the length of a log at a time and by severing each log thereof at the height of the upper end of the lower part of the tree by the severing device 9. The lower part of the tree forms the last log, when it is cut at the butt by severing device 6 in the last stage of harvesting.

The details of the tree harvesting device designed to carry out the method according to the invention can, of course, be constructed in many other ways. The clamp, severing and other means can be of any type previously known in the field. According to the need, other parts can be added to the device; means for bunching the logs or to lighten the installment will serve as examples. The device is used most efficiently when operated hydraulically.

I claim:

1. A tree harvesting method for limbing and bucking a standing tree by means of a harvesting device moved by a skidder or a corresponding carrier comprising: severing an upper part of a tree from a lower butt portion thereof; limbing and bucking the thus-severed upper part of the tree while maintaining said upper part of the tree in an upright attitude and before the tree is severed at the lower butt portion thereof; and securing the harvesting device tightly to the lower butt portion of the tree during the said limbing and bucking procedure so that at least a part of the pressure against the harvesting device is transferred to the lower butt portion of the tree during limbing and bucking of the severed upper part of the tree.

2. A tree harvesting method for limbing and bucking a standing tree by means of a harvesting device moved by a skidder or a corresponding carrier comprising: limbing and bucking the upper part of the tree before the tree is severed at the butt; and securing the harvesting device tightly to the lower part of the tree during said limbing and bucking procedure so that at least a part of the pressure against the harvesting device is transferred to the lower part of the tree, the upper part of the tree being bucked into logs, after it has been severed from the lower part of the tree, by lowering it in upright position the length of a log at a time to the side of the lower part of the tree and by severing each log thereof at the height of the upper end of the lower part of the tree.

3. The tree harvesting method of claim 2, wherein the upper part of the tree is severed from the lower part of the tree at the height that corresponds approximately to the length of a log.

4. A tree harvesting device moved by a skidder or a corresponding carrier and adapted to limb a standing tree and to buck it into logs, comprising a body;
support and clamp means for securing the body of the device tightly to a lower part of the standing tree;
a severing device connected to an upper end of the body of the harvesting device and mounted at a height that corresponds approximately to the length of a log;
clamp and limbing means to support and limb the upper part of the tree and an arm on which said clamp and limbing means is located and which can rotate about a vertical axis and move upwards and downwards in relation to the body of the harvesting device; and
a severing device connected to said support and clamp means.

5. The combination of claim 4 and including a pair of rolls for guiding the upper part of the tree for movement in a downward direction.

6. In a tree harvesting device which is adapted to be moved by a skidder or a corresponding carrier to a tree which is to be worked on for limbing and bucking a standing tree, in combination: a body; limbing and bucking means carried by said body for severing an upper part of a tree from a lower part thereof, for then guiding the severed upper part of the tree for downward movement, and for limbing and bucking the upper part of the tree before the tree is severed at the butt thereof and while said upper part remains in an upright attitude; and means for securing said body tightly to the lower part of the tree during operation of said limbing and bucking means at the severed, upright upper part of the tree, so that at least part of the pressure against said body is transferred to the lower part of the tree.

7. The combination of claim 6 and wherein said means for securing said body to the lower part of the tree carries at the butt of the tree a severing means for severing the lower part of the tree at the butt thereof after limbing and bucking of the upper part of the tree.

8. The combination of claim 6 and wherein said limbing and bucking means is carried by said body for swinging movement with respect thereto about an upright axis after said upper part of the tree is severed from said lower part thereof to situate said upper part of the tree at a location which is out of line with said lower part thereof, and said limbing and bucking means limbing and bucking the upper part of the tree while said upper part is at said location out of line with the lower part of the tree.

9. The combination of claim 8 and wherein said limbing and bucking means includes a severing means for severing said upper part of the tree from the lower part thereof, said severing means being swingable with respect to said body and together with said upper part of the tree to said location out of line with the lower part thereof, and said severing means severing from said upper part of the tree a log of predetermined length each time said upper part of the tree has moved downwardly through a given distance.

10. The combination of claim 9 and wherein said severing means is situated at a lower end region of said limbing and bucking means over a free space situated beside said lower portion of the tree after said severing means together with the remainder of said limbing and bucking means has been swung with respect to said body to said location so that said upper part of the tree is free to move downwardly into the latter space, said severing means acting to cut a log from said upper part of said tree each time said upper part has moved downwardly into said space to a given distance, and said limbing and bucking means responding to the downward movement of said upper part of the tree into said space for limbing the upper part of the tree.

* * * * *